US011385764B2

(12) United States Patent
Takeuchi et al.

(10) Patent No.: US 11,385,764 B2
(45) Date of Patent: Jul. 12, 2022

(54) BLOW MOLDING DEVICE AND INTERFACE DEVICE PROVIDED IN BLOW MOLDING DEVICE

(71) Applicant: NISSEI ASB MACHINE CO., LTD., Nagano (JP)

(72) Inventors: Mikako Takeuchi, Nagano (JP); Takashi Kobayashi, Nagano (JP); Yasuhiro Hidaka, Nagano (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 0 days.

(21) Appl. No.: 16/756,342

(22) PCT Filed: Oct. 22, 2018

(86) PCT No.: PCT/JP2018/039250
§ 371 (c)(1),
(2) Date: Apr. 15, 2020

(87) PCT Pub. No.: WO2019/078371
PCT Pub. Date: Apr. 25, 2019

(65) Prior Publication Data
US 2020/0269485 A1   Aug. 27, 2020

(30) Foreign Application Priority Data

Oct. 20, 2017  (JP) .............................. JP2017-203982

(51) Int. Cl.
*G06F 3/04817* (2022.01)
*B29C 49/06* (2006.01)
(Continued)

(52) U.S. Cl.
CPC .......... *G06F 3/04817* (2013.01); *B29C 49/06* (2013.01); *B29C 49/78* (2013.01);
(Continued)

(58) Field of Classification Search
CPC .............. G06F 3/04817; G06F 3/0482; G06F 3/04847; B29C 49/00; B29C 49/06; B29C 49/78; G05B 23/02–0297
See application file for complete search history.

(56) References Cited

U.S. PATENT DOCUMENTS 5,470,218 A * 11/1995 Hillman ................ B29C 45/768
264/40.6
6,185,477 B1   2/2001 Palm et al.
(Continued)

FOREIGN PATENT DOCUMENTS

CN    1196129 A    10/1998
CN    1623760 A    6/2005
(Continued)

OTHER PUBLICATIONS

Official Communication (ISR) dated Jan. 29, 2019 in International Patent Application No. PCT/JP2018/039250, and English translation thereof.
(Continued)

*Primary Examiner* — Mong-Shune Chung
(74) *Attorney, Agent, or Firm* — Greenblum & Bernstein, P.L.C.

(57) ABSTRACT

This blow molding device is provided with: a display device configured to display on a setting screen information for setting control conditions for a plurality of objects to be controlled; and a display control device configured to control a display state of the setting screen. The display control device is configured to: cause a main display unit to display the information for setting the control conditions, as required; and cause a sub-display unit to constantly display status information which makes it possible to know operational states of the objects to be controlled, and a display
(Continued)

switching icon for causing the main display unit to display operating icons of the objects to be controlled.

10 Claims, 10 Drawing Sheets

(51) Int. Cl.
    *B29C 49/78*     (2006.01)
    *G06F 3/0482*     (2013.01)
    *G06F 3/04847*     (2022.01)
    *B29L 31/00*     (2006.01)

(52) U.S. Cl.
    CPC ........ *G06F 3/0482* (2013.01); *G06F 3/04847* (2013.01); *B29L 2031/712* (2013.01)

(56) References Cited

U.S. PATENT DOCUMENTS

| | | | |
|---|---|---|---|
| 6,848,895 B2 * | 2/2005 | Konishi | B29C 45/76 264/40.5 |
| 7,346,425 B2 * | 3/2008 | Nishizawa | B29C 45/76 264/40.1 |
| 9,937,650 B2 * | 4/2018 | Dimmler | G05B 19/409 |
| 2005/0194705 A1 | 9/2005 | Smith | |
| 2006/0247822 A1 | 11/2006 | Nishizawa et al. | |
| 2008/0228315 A1 * | 9/2008 | Wendner | G05B 23/0267 700/180 |
| 2011/0154243 A1 | 6/2011 | Styga et al. | |
| 2014/0147540 A1 | 5/2014 | Dimmler et al. | |
| 2015/0086667 A1 | 3/2015 | Grimm | |
| 2017/0255192 A1 * | 9/2017 | Thwaites | G06F 3/04845 |

FOREIGN PATENT DOCUMENTS

| | | |
|---|---|---|
| CN | 1853907 A | 11/2006 |
| CN | 1964832 A | 5/2007 |
| CN | 101138884 A | 3/2008 |
| DE | 102012005975 A1 | 9/2013 |
| JP | 06-305000 | 11/1994 |
| JP | 2000-127235 A | 5/2000 |
| JP | 3231457 B2 | 11/2001 |
| JP | 2004-255589 | 9/2004 |
| JP | 2006-205417 | 8/2006 |
| JP | 2007-021827 | 2/2007 |
| WO | WO-2008149742 A1 * | 12/2008 ............. B29C 45/76 |

OTHER PUBLICATIONS

Official Communication (Written Opinion) dated Jan. 29, 2019 in International Patent Application No. PCT/JP2018/039250, and English translation thereof.

Office Action issued in Chinese Counterpart Patent Appl. No. 201880081896.7, dated Jun. 29, 2021, along with an English translation thereof.

Extended European Search Report issued in European Patent Office (EPO) Patent Application No. 18868826.1, dated May 20, 2021.

* cited by examiner

BLOW MOLDING DEVICE AND INTERFACE DEVICE PROVIDED IN BLOW MOLDING DEVICE

TECHNICAL FIELD

The present invention relates to a blow molding device configured to mold a hollow container made of resin, and more particularly, to an interface device provided to a blow molding device having improved workability when setting control conditions for a plurality of control targets (operating conditions, molding conditions and the like) and operability of the control targets.

BACKGROUND ART

In the related art, for example, as a method of molding a hollow body made of synthetic resin, known is technology of blow molding a preform obtained by injection molding or extrusion molding into a hollow body by a blow molding device (for example, refer to PTL 1).

CITATION LIST

Patent Literature

PTL 1: JP-A-H06-305000

SUMMARY OF INVENTION

Technical Problem

The above-described blow molding device has more drive equipment that is to be control targets and molding parameters than an injection molding device, and it is necessary to set a plurality of control conditions for each of the control targets. For example, in a molding station of the blow molding device, the control conditions (control items) include: operating conditions of each equipment (a speed, a position and the like of a drive unit); and molding conditions (a temperature, a blow pressure, an introduction timing of blow air, and the like), and there are a number of control conditions associated with the operating conditions and the molding conditions. Also, in the molding station, it may be necessary to set the control conditions for each cavity.

Therefore, when operating the blow molding device for implementing the blow molding, it is necessary for an operator to set many control conditions through an interface device (human interface device).

Usually, since the optimal control conditions in the blow molding device vary depending on a shape and a specification of the container, a production quantity (molding cycle time) and the like, the optimal control conditions are determined by trial and error. For this reason, the operator has to operate many times a setting screen of a display of the interface device, for example, so as to change and adjust each of the control conditions. Here, according to the interface device of the blow molding device of the related art, there is a problem that operability cannot be said as favorable such as an increase in screen shift when the operator sets/corrects the diverse control conditions.

The present invention has been made in view of the above situations, and an object thereof is to provide a blow molding device and an interface device provided to a blow molding device capable of relatively easily performing, on a setting screen, operations such as setting/correction of control conditions for a plurality of control targets.

Solution to the Problem

One aspect of the present invention for achieving the above object is an interface device configured to be provided to a blow molding device that blow molds a preform into a hollow body, the preform being obtained by an injection molding, the interface device including: display means for displaying, on a setting screen, information for setting control conditions for a plurality of control targets; and display control means for controlling a display state of the setting screen, the display control means being configured to: cause a main display section to display the information for setting the control conditions as required; and cause a sub-display section to constantly display: status information for perceiving operational states of the control targets; and a display switching icon for causing the main display section to display operating icons of the control targets.

Herein, preferably, the sub-display section includes: a header section provided above the main display section, and a footer section provided below the main display section, and the display control means is configured to cause the header section to display the status information, and is configured to cause the footer section to display the display switching icon.

Also, preferably, the display control means is configured to cause the main display section to display control condition groups for the plurality of control targets with one screen as required, the control condition groups having correlativity.

Also, preferably, the display control means is configured to cause the main display section to display control condition groups for the plurality of control targets with one screen as required, the control condition groups being included in preset control groups.

Also, another aspect of the present invention is a blow molding device configured to blow mold a preform into a hollow body, the preform being obtained by an injection molding, the blow molding device including: display means for displaying, on a setting screen, information for setting control conditions for a plurality of control targets; and display control means for controlling a display state of the setting screen, the display control means being configured to: cause a main display section to display the information for setting the control conditions as required; and cause a sub-display unit to constantly display: status information for perceiving operational states of the control targets; and a display switching icon for causing the main display section to display operating icons of the control targets.

Advantageous Effect of Invention

According to the present invention, in the blow molding device, it is possible to relatively easily perform operations such as setting/correction of control conditions for the plurality of control targets.

DESCRIPTION OF EMBODIMENTS

Hereinbelow, an embodiment of the present invention will be described in detail with reference to the drawings. First, an overall configuration of a blow molding device in accordance with the present invention is briefly described with reference to FIG. 1.

The blow molding device in accordance with the present invention is a device for manufacturing a resin container. The blow molding device in accordance with the present invention includes a plurality of stations.

Figure 1:
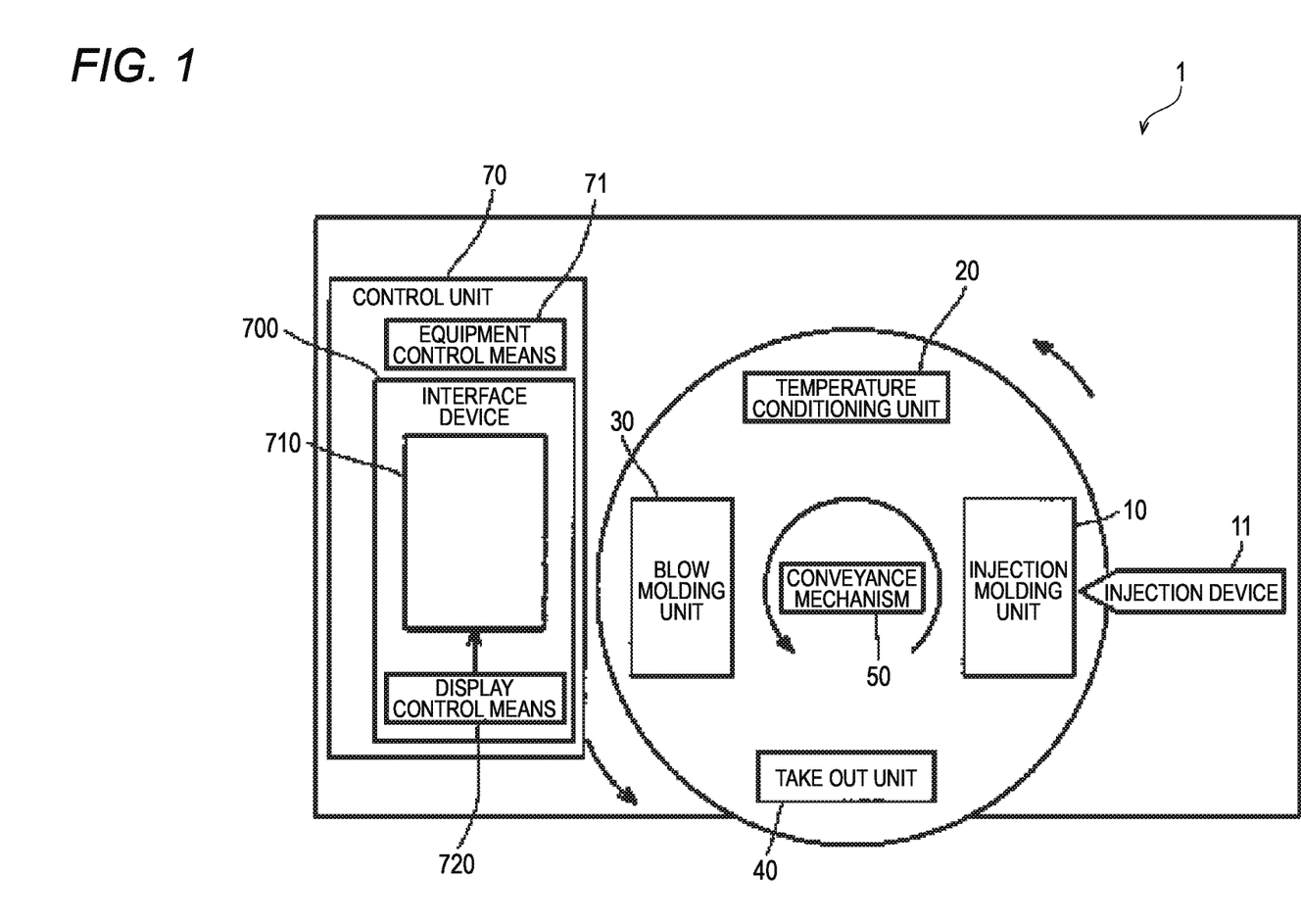
FIG. 1 depicts a schematic configuration of a blow molding device in accordance with a present embodiment.

As shown in FIG. 1, the blow molding device 1 in accordance with the present embodiment includes: an injection molding unit (injection molding station) 10 including an injection device 11 for forming a preform; a temperature conditioning unit (temperature conditioning station) 20 for adjusting a temperature of the preform molded in the injection molding unit 10; a blow molding unit (blow molding station) 30 for blow molding the preform into a container; and a take out unit (take out station) 40 for taking out the formed container. The blow molding device 1 is configured as a hot parison type or one stage type, as a whole. Also, the blow molding device 1 configured as described above is referred to as an injection blow molding device.

In the blow molding device 1, the injection molding unit 10, the temperature conditioning unit 20, the blow molding unit 30 and the take out unit 40 are provided in positions rotated by predetermined angles (90°, in the present embodiment) about a conveyance mechanism 50. In the meantime, the conveyance mechanism 50 has the same number of transport plates as the processing units of the injection molding unit 10, the temperature conditioning unit 20, the blow molding unit 30 and the take out unit 40. In the present embodiment, the four transport plates are arranged at intervals of 90°, as seen from above (not shown). The conveyance mechanism 50 is configured to intermittently rotate the transport plates and to arrange the same at the respective processing units.

The blow molding device 1 includes a controller 70 including equipment control means 71. The equipment control means 71 is configured to control a variety of equipment which is control targets provided to at least the temperature conditioning unit 20, the blow molding unit 30, and the take out unit 40. The equipment control means 71 is configured to control operations of the diverse equipment provided to the injection molding unit 10, the temperature conditioning unit 20, the blow molding unit 30, the take out unit 40 and the like.

The controller 70 is configured by, for example, a storage device (a ROM, a RAM and the like), a central processing unit (CPU), a timer counter and the like. The controller 70 includes an interface device (human interface device) 700 for inputting/outputting setting values of the diverse equipment and operating the diverse equipment. The present invention is characterized by a configuration of the interface device 700, in the below, the configuration of the interface device 700 is described in detail.

Figure 2:
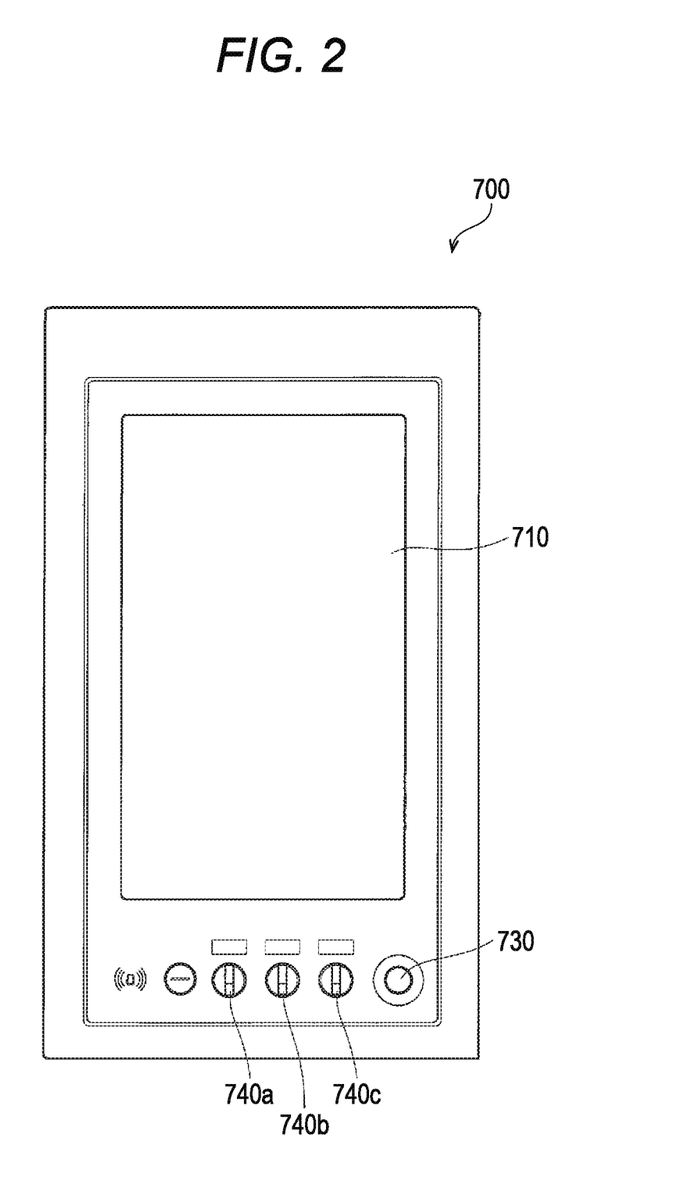
FIG. 2 is a front view depicting an outer shape of an interface device provided to the blow molding device in accordance with the present embodiment.

As shown in an outer shape of FIG. 2, the interface device 700 includes: a relatively large-sized display (display means) 710 configured to display, on a screen, setting information for setting control conditions for the diverse equipment that is control targets; and display control means 720 (refer to FIG. 1) configured to control a display state of the screen of the display 710. In the present embodiment, the display 710 is configured by, for example, a touch panel or the like, and also, functions as input means by which an operator inputs a variety of control conditions (operating conditions for the diverse equipment, molding conditions for the respective molding stations, and the like) and functions as operating means by which the operator operates the blow molding device 1.

In the present invention, most of buttons and switches for operating the blow molding device 1 are provided at a predetermined part of the display 710. Also, one mechanical button 730 and three mechanical switches 740 (740a, 740b, 740c) are provided below the display 710, from standpoints of safety and operability. The numbers and arrangements of the mechanical button 730 and the mechanical switches 740 are not particularly limited and may be determined as appropriate, as required.

In the present embodiment, the mechanical button 730 is allotted with an emergency stop function of the blow molding device 1, which is very important for safety. Also, each of the mechanical switches 740 is allotted with a function that requires a delicate operation or is easy to operate in an analog manner, for example. In the present embodiment, the mechanical switches 740 are respectively allotted with a function of operating advance/retreat of the injection device 11, a function of operating advance/retreat of a screw, and a function of operating elevation of an injection core mold.

In the meantime, the mechanical button 730 is a two-stage type of ON/OFF. The mechanical switch 740 is configured to change a moving speed of each of the control targets (movable members), in accordance with an amount of rotation thereof. Specifically, the mechanical switch 740 is neutrally positioned at a central part in a rotating direction, and is rotated leftward in the drawing from the neutral position, so that each of the control targets (movable members) is advanced or moved up, and is rotated rightward in the drawings, so that each operate target is retreated or moved down.

The display 710 includes: a main display section 711 that can display (change) a variety of information as required; and a sub-display section 712 configured to constantly display specific information and the like. In the present embodiment, a central area of the display 710 functions as the main display section 711, and a header section 713 above the main display section 711 and a footer section 714 below the main display section 711 function as the sub-display section 712.

Figure 3:
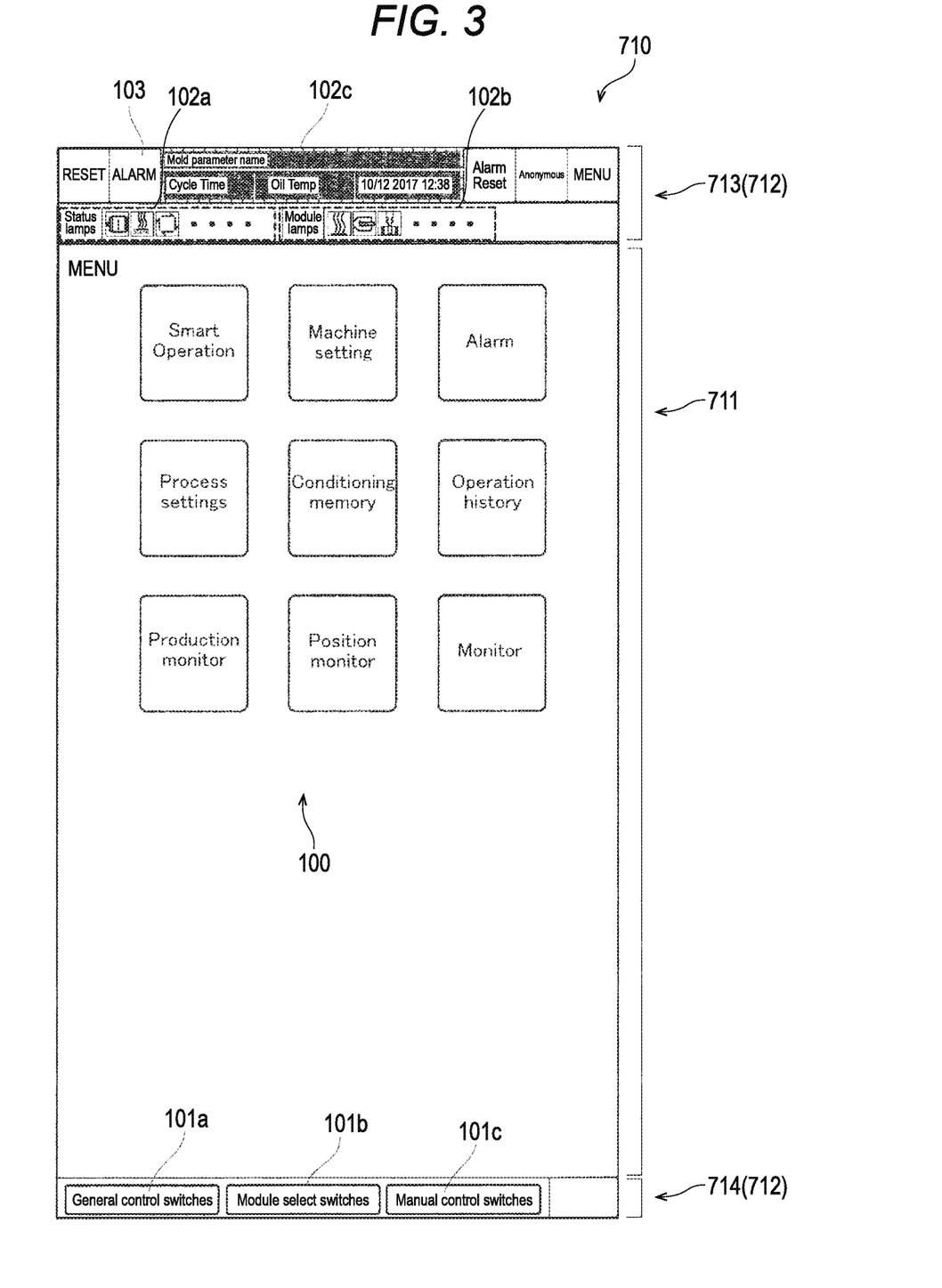
FIG. 3 depicts an example of a display screen provided to the interface device in accordance with the present embodiment.

The display control means 720 is configured to cause the main display section 711 to display information for setting the control conditions. For example, as shown in FIG. 3, the display control means 720 causes the main display section 711 to display a plurality of specific menu icons 100 on an initial screen of the display 710. Then, when the operator selects any one of the menu icons 100, the display control means 720 appropriately switches the information displayed on the main display section 711 in accordance with the selected menu icon 100.

Also, the display control means 720 is configured to cause the sub-display section 712 to constantly display status information 102 for perceiving operational states of the control targets, and display switching icons 101 for causing the main display section 711 to display operating icons of the control targets. Specifically, the display control means 720 is configured to cause the header section 713 to display the status information 102 relating to the diverse equipment that is the control targets, and to cause the footer section 714 to display the display switching icons (device operating icons) 101. In the meantime, the menu icons 100 and the display switching icons 101 may be displayed by any of symbols, figures, and characters or a combination thereof.

In the present embodiment, as the status information 102, information of each of an operation status display group 102*a*, a selected module display group ("Module lamps") 102*b*, and a cycle time etc. display group ("Cycle time" and "Oil temp") 102*c* is displayed on the header section 713. Although the contents of the status information displayed on the header section 713 are not specifically limited, at least three piece of information relating to operation states of the blow molding device 1 are preferably displayed on the header section 713.

The operation status display group ("Status lamp") 102*a* displays information indicative of whether a pump is in an operation state, whether an operation mode is a manual operation mode or an automatic operation mode, and the like, by diverse corresponding icons. The selected module display group 102*b* displays information indicative of whether diverse drive devices (diverse modules) of the temperature conditioning unit 20 and the blow molding unit 30 are in a useable state, and the like, by the diverse corresponding icons. The cycle time etc. display group 102*c* displays information of actual measurement values such as how many seconds the molding cycle time is, and what degrees Celsius an operating oil is, every predetermined time.

The header section 713 is further provided with an alarm icon 103 so that alarm information of the blow molding device 1 can be displayed from any setting managing screen. In the meantime, instead of the alarm icon 103 or together with the alarm icon 103, an alarm display group ("ALARM") capable of checking and specifying a part of the blow molding device 1 in which a failure or a malfunction has occurred may be provided on the header section 71 (the main display section 711) that is constantly displayed.

Also, on the footer section 714, as the display switching icons 101, a general operating icon group ("General control switches") 101*a*, a module selecting icon group ("Module select switches") 101*b* and a manual operating icon group ("Manual control switches") 101*c* are displayed. Although the type and number of the display switching icons 101 displayed on the footer section 714 are not particularly limited, the plurality of display switching icons 101 is preferably displayed as selectable on the footer section 714.

When the general operating icon group 101*a* is selected, a plurality of icons relating to general operations of the blow molding device 1 such as manual operation, automatic operation, pump drive, pump stop, operation start, operation stop and the like is displayed as selectable on the display 710.

When the module selecting icon group 101*b* is selected, a plurality of icons for designating whether the diverse modules can be used (operated), such as a heating operation of an injection cylinder in the injection device 11, an advance/retreat drive of a screw, a mold opening/closing drive in the temperature conditioning unit 20 and the blow molding unit 30, and the like is displayed as selectable on the display 710.

When the manual operating icon group 101*c* is selected, a plurality of module operating icons corresponding to a rotating operation of the conveyance mechanism 50, an elevation operation of a lip mold, an injection core mold and the like, an opening/closing operation of a blow mold, and the like is displayed on the display 710. In the meantime, the module operating icons can be used when a manual operation icon of the general operating icon group 101*a* is designated, and can change operation time and the like of the diverse modules with a time length corresponding to a pressing time (touch time) (refer to FIGS. 3 and 8).

Also, although described in detail later, the display control means 720 is configured to cause the main display section 711 to display the control conditions and the molding conditions for the plurality of control targets (diverse equipment and diverse molding stations) with one screen as required, the control conditions and the molding conditions having correlativity with each other.

Also, the display control means 720 is configured to cause the main display section 711 to display the control conditions for the plurality of control targets included in a preset control group with one screen as required.

Herein, a screen switching (screen shift) of the display 710 when setting/changing the control conditions for the diverse equipment is described with reference to a flowchart of FIG. 4 and examples of a screen shown in FIGS. 3 and 5 to 9.

On a screen of the interface device 700, a state in which the plurality of menu icons (first menu icons) 100 is displayed on the main display section 711 is an initial screen (refer to FIG. 3).

Figure 4:
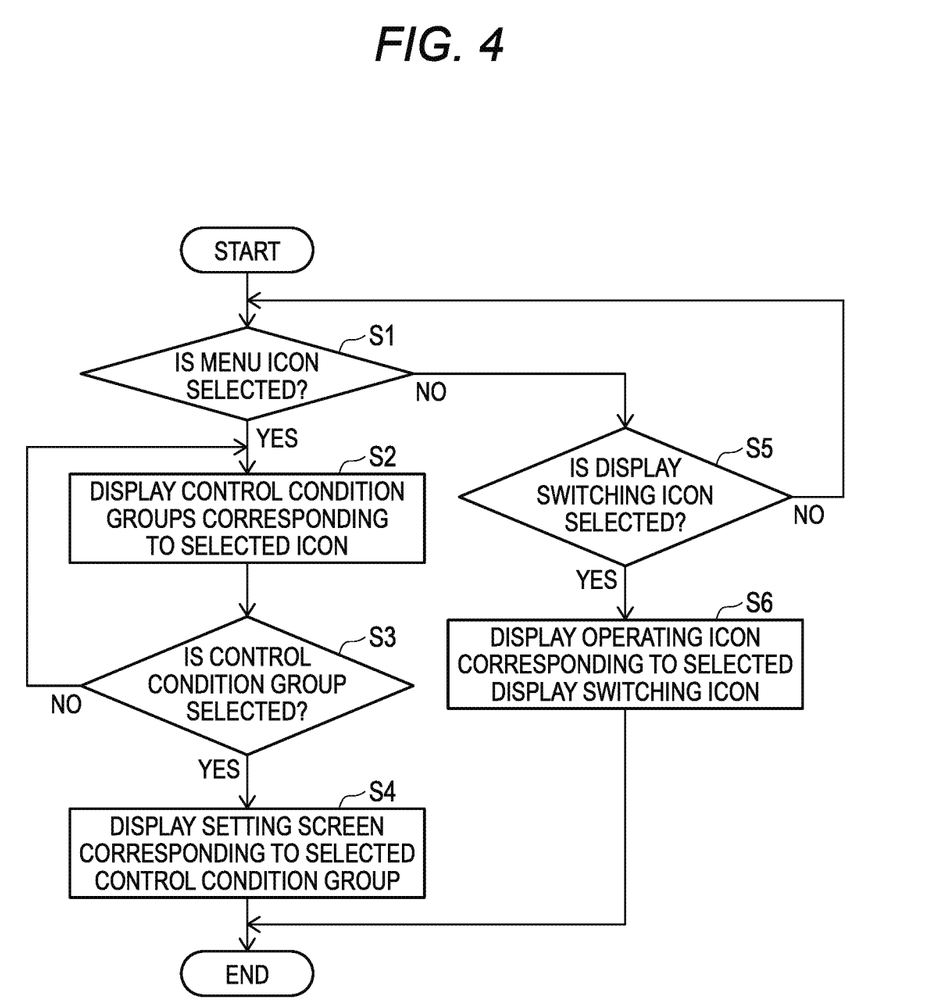
FIG. 4 is a flowchart depicting a setting change sequence of the interface device in accordance with the present embodiment.

As shown in FIG. 4, when the operator first selects any one of the menu icons 100 on the initial screen (step S1: Yes), the main display section 711 is switched and information (setting managing screen) corresponding to the selected menu icon 100 is displayed.

Figure 5:
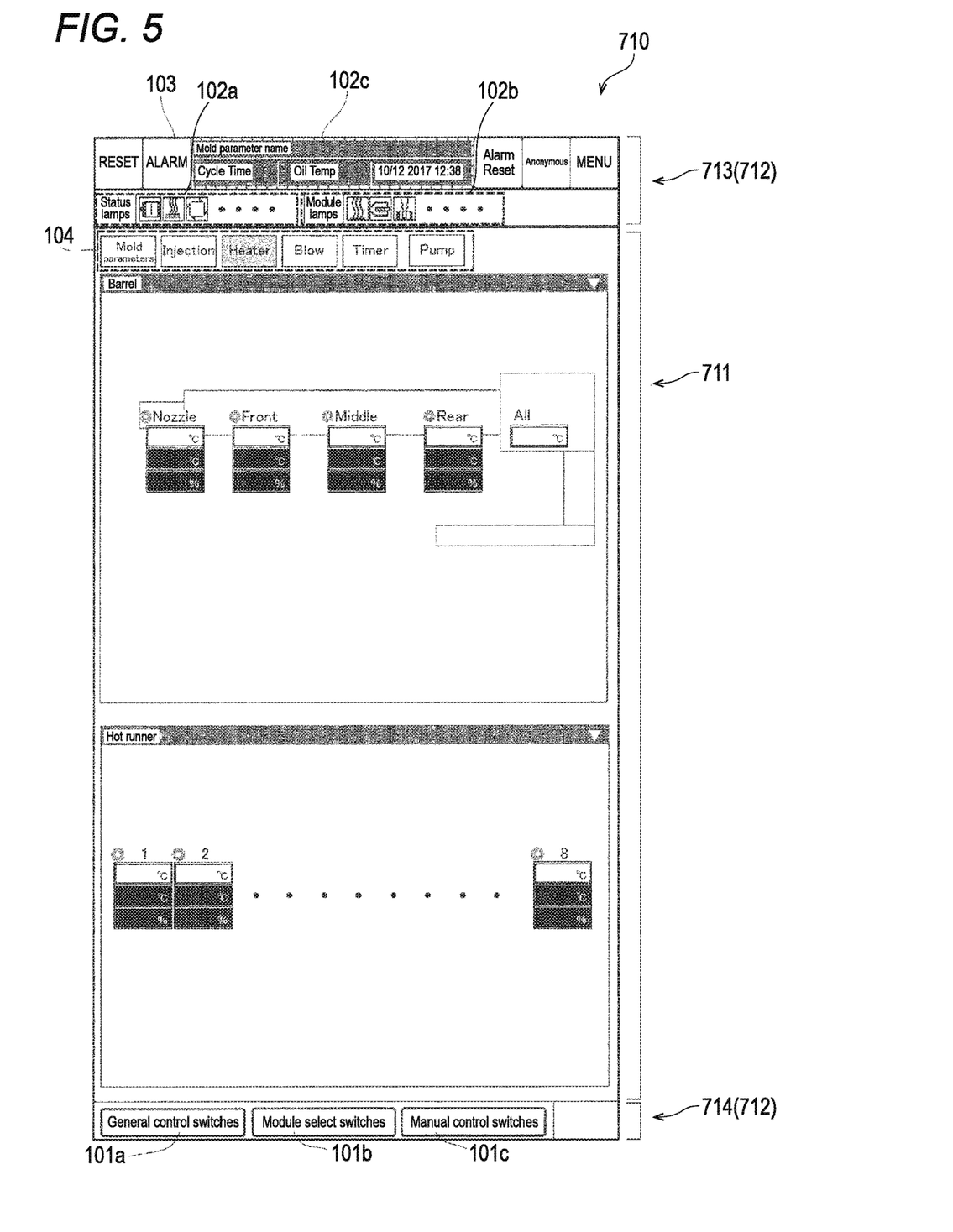
FIG. 5 depicts an example of the display screen provided to the interface device in accordance with the present embodiment.

For example, when a molding process setting overview ("Process settings") of the menu icons 100 is selected, the main display section 711 is switched, and icons (second menu icons) 104 of control condition groups each of which is grouped for each control group having correlativity are displayed in the vicinity of a boundary of the main display section 711 with the header section 713, as shown in FIG. 5 (step S2). Then, when the icon 104 of any one of control condition groups is selected (step S3: Yes), a setting managing screen corresponding to the selected control condition group is displayed on the main display section 711 (step S4). In the meantime, in FIGS. 5, 6 and 9 to be described later, white frames are parts for inputting (setting/correcting) the diverse control conditions, and actual measurement values of the corresponding control conditions are displayed in black frame parts.

In the example of FIG. 5, as the control condition groups (control item groups) of the molding process setting overview ("Process settings"), the icons 104 of a simple molding condition selling group ("Mold parameters"), an injection molding condition setting group ("Injection"), a temperature conditioning condition setting group ("Heater"), a blow molding condition setting group ("Blow"), a timer condition setting group ("Timer") and a pump condition setting group ("Pump") are displayed. A setting managing screen having control conditions relating to a setting group selected from the groups is displayed on the main display section 711 below the icons 104.

For example, when the icon 104 of the temperature conditioning condition setting group ("Heater") is selected from the control condition groups, the main display section 711 is switched, and as shown in FIG. 5, setting managing screens (control conditions) of equipment (part), which is a category corresponding to "Heater" (a phrase "heating/temperature conditioning") and requires a high-temperature setting, for example, an injection cylinder ("Barrel") and a hot runner ("Hot runner"), and a temperature conditioning device ("Conditioning") are divided and displayed above and below. In each white frame part of the main display section 711, for example, a control condition value or molding condition value of which a unit is a centigrade temperature is input.

Thereby, the operator can easily perceive the operating conditions of the diverse equipment and the molding conditions of the molding station, which have correlativity with the category "Heater" (heating/temperature conditioning), with one screen, and can set/correct (adjust/change) the same.

In the example of FIG. 5, the setting managing screen of the temperature conditioning device ("Conditioning") is not displayed on the main display section 711. However, since the display 710 can be scrolled with an operation of touching the screen, the operator can scroll the screen to display any necessary setting managing screen (for example, the setting managing screen of the temperature conditioning device ("Conditioning")), thereby setting/correcting the diverse control conditions.

Also, when the icon 104 of the simple molding condition setting group ("Mold parameters") is selected from the control condition groups, setting screens of control conditions of which the frequency in use is high in each of the control condition groups are displayed on the main display section 711.

Figure 6:
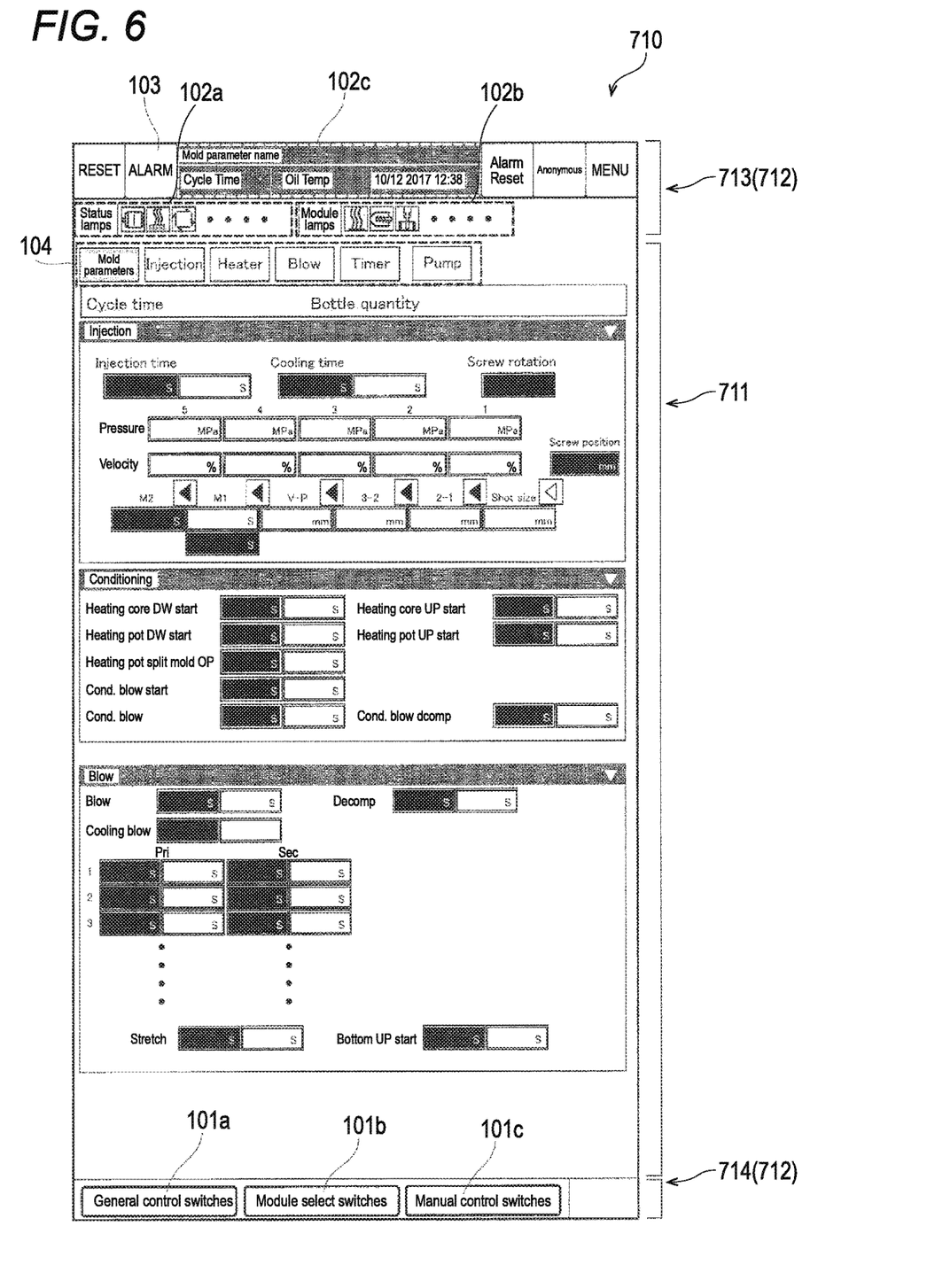
FIG. 6 depicts an example of the display screen provided to the interface device in accordance with the present embodiment.

For example, as shown in FIG. 6, when the icon 104 of the simple molding condition setting group ("Mold parameters") is selected, the setting managing screens of specific control conditions and molding conditions of which the frequency in use is high in each of the injection molding condition setting group ("Injection"), the temperature conditioning condition setting group ("Heater"), the blow molding condition setting group ("Blow"), the timer condition setting group ("Timer") and the pump condition setting group ("Pump") are displayed on the main display section 711.

The control conditions and molding conditions of which the frequency in use is high in each of the other control condition groups may be exemplified, as follows.

Injection molding condition setting group ("Injection") includes: injection time (filling time, "Injection time"); cooling time ("Cooling time"); pressure ("Pressure") and velocity ("Velocity") upon filling; velocity-pressure control switching position ("V-P"); and pressure holding time ("M1").

Temperature conditioning condition setting group ("Conditioning" or "Heater") includes: vertical movement start time of a temperature conditioning core or a temperature conditioning pot ("Heating core DW start", "Heating core UP start", "Heating pot DW start", "Heating pot UP start"); temperature conditioning blow start time ("Cond. blow start"); temperature conditioning blow duration time ("Cond. blow"); and temperature conditioning blow exhaust time ("Cond. blow decomp.")

Blow molding condition setting group ("Blow") includes: total blow molding time ("Blow"); blow exhaust time ("Decomp."); primary pressure (low pressure) blow start time ("Pri."); secondary pressure (high pressure) blow start time ("Sec."); stretch rod descent start time ("Stretch"); and bottom mold ascent start time ("Bottom UP start")

In each of the white frame parts of the simple molding condition setting group ("Mold parameters"), for example, a control condition value or a molding condition value of which a unit is "second" for time, "MPa" for pressure, and "mm" for position is input.

In this way, the setting screens of the control conditions of which the frequency in use is high in each of the control condition groups are integrated and displayed on one screen, so that workability of setting/correction operations of the diverse control conditions and molding conditions is improved. Also, since it is possible to change the control conditions while checking the corresponding actual measurement values, it is possible to optimize the diverse control conditions and molding conditions more easily than the interface device of the related art.

Also, the alignment of the control condition groups (icons 104) displayed on the upper part of the main display section 711 may be preset by the operator or may be automatically changed and displayed in order of the control condition groups (icons 104) of which the frequency in use is higher.

Herein, examples where icons other than the molding condition setting overview ("Process settings") are selected on the initial screen in which the menu icons 100 are displayed are described.

Figure 7:
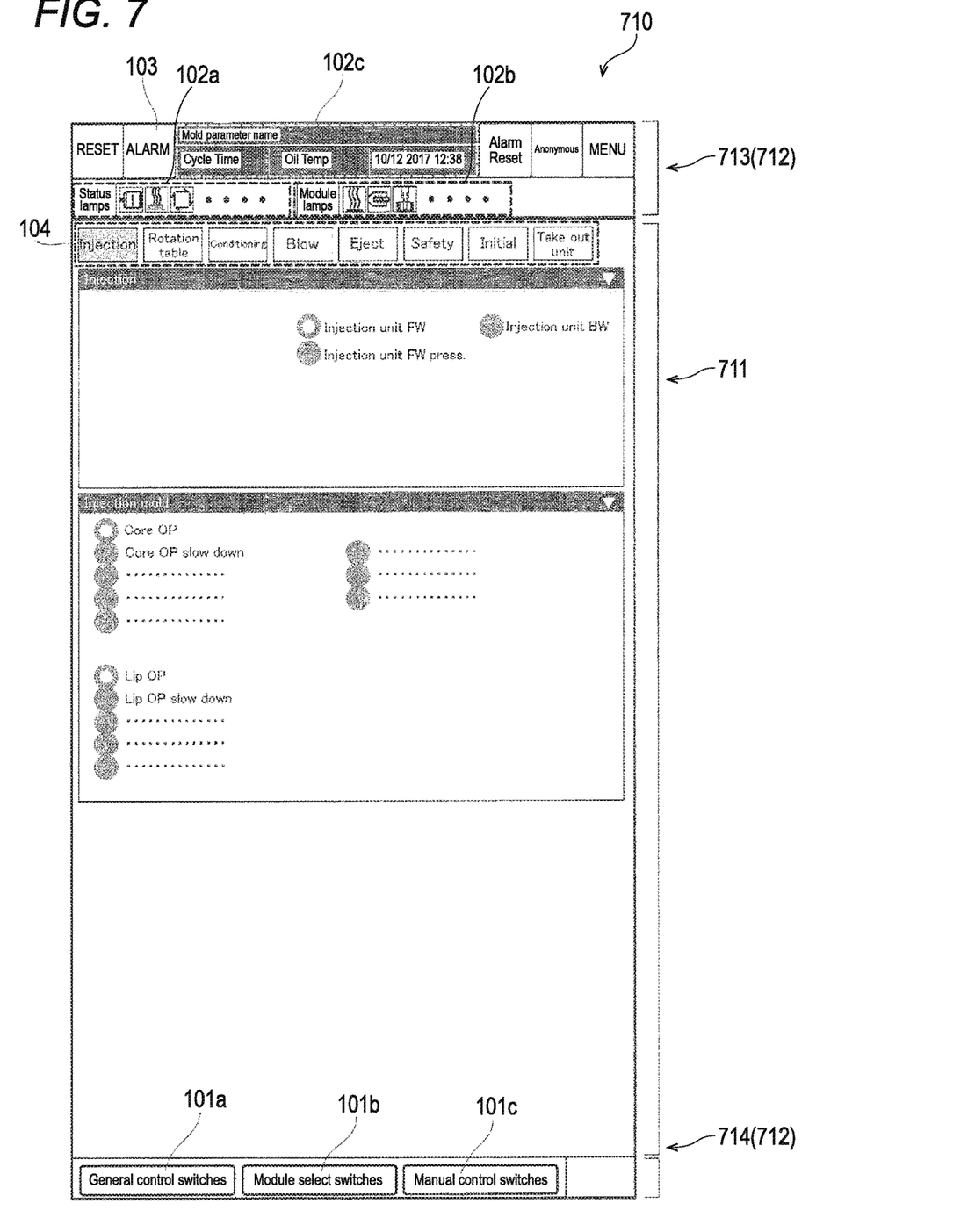
FIG. 7 depicts an example of the display screen provided to the interface device in accordance with the present embodiment.

When a position monitor overview ("Position monitor") is selected on the initial screen, for example, the display of the main display section 711 is switched, and the icons 104 of predetermined control condition groups are displayed in the vicinity of the boundary of the main display section 711 with the header section 713, as shown in FIG. 7. That is, the control condition groups (icons) for the plurality of control targets included in the preset control groups are displayed with one screen on the main display section 711. Also, the detailed information (setting managing screen) relating to a control condition group selected from the control condition groups (icons) is displayed on the main display section 711.

In the example of FIG. 7, as the control condition groups (control item groups), the icons 104 of an injection molding unit-related member position group ("Injection"), a conveyance mechanism-related group ("Rotation table"), a temperature conditioning unit-related member position group ("Conditioning"), a blow molding unit-related member position group ("Blow"), an extraction unit-related member position group ("Eject"), a movable member origin position group ("Initial") and the like are displayed. When the injection molding unit-related member position group ("Injection") is selected among them, the detailed information (setting display screens) about positions relating to an injection device ("Injection") and a mold for injection molding unit ("Injection mold") is displayed on the main display section 711, the detailed information having correlativity.

In the setting display screens, position information of each of the control targets (movable members) can be perceived/checked. For example, when an injection core mold of the injection molding unit 10 is decelerated or stopped in a normal position during a mold opening drive, a lamp of an injection core mold slow down ("Core OP slow down") or a mold opening of an injection core mold (Core OP) in a screen of the mold for injection molding unit ("Injection mold") is turned on. Thereby, the operator can perceive or check information indicative of whether each movable member is in a normal position and normally operates, so that it is possible to prevent each movable member from being damaged due to an improper position or improper operation thereof.

Figure 8:
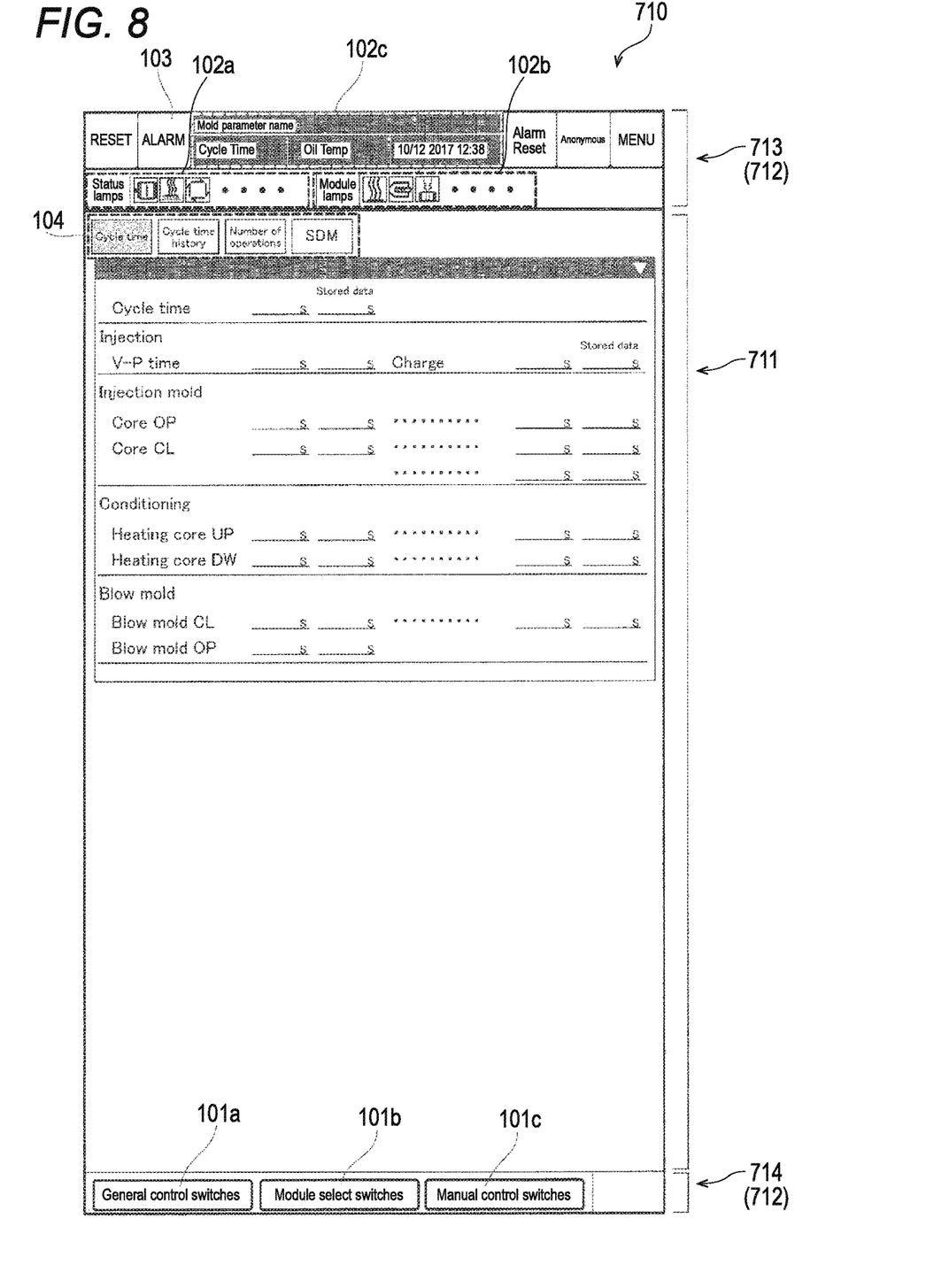
FIG. 8 depicts an example of the display screen provided to the interface device in accordance with the present embodiment.

Also, when a monitor overview ("Monitor") is selected on the initial screen, for example, the display of the main display section 711 is switched, and the icons 104 of predetermined control condition groups are displayed in the vicinity of the boundary of the main display section 711 with the header section 713, as shown in FIG. 8. That is, the control condition groups (icons) for the plurality of control targets included in the preset control groups are displayed with one screen on the main display section 711. Also, the detailed information (setting managing screen) relating to a control condition group selected from the control condition groups is displayed on the main display section 711.

In the example of FIG. 8, the icons 104 of a molding cycle time information group ("Cycle time"), a cycle time history information group ("Cycle time history"), an operation-number-of-times information group ("Number of operations") and the like are displayed, and the detailed information (setting managing screen) of the molding cycle time information group ("Cycle time") selected among them is displayed on the main display section 711.

In the screen of the molding cycle time information group ("Cycle time"), actual operation times of the diverse movable members, such as a molding cycle time ("Cycle time"), a velocity-pressure control switching time ("V-P") and an injection time ("Charge") of the injection device ("Injection"), mold opening/closing operation times ("Core OP", "Core CL", . . . ) of diverse molds belonging to the mold for injection molding ("Injection mold"), ascent and descent operation times ("Heating core UP", "Heating core DW", . . . ) of the diverse movable members in the temperature conditioning unit ("Conditioning"), opening/closing operation times ("Blow mold CL", "Blow mold OP") of diverse molds belonging to a mold for blow molding ("Blow mold") and the like, can be checked while comparing the same with setting values (although not shown in FIG. 8, the actual measurement values are displayed on a left side and the setting values are displayed on a right side). Thereby, the operator can check/verify in which molding station the molding cycle time can be shortened, whether the diverse movable members are operating at appropriate times, and the like.

Figure 9:
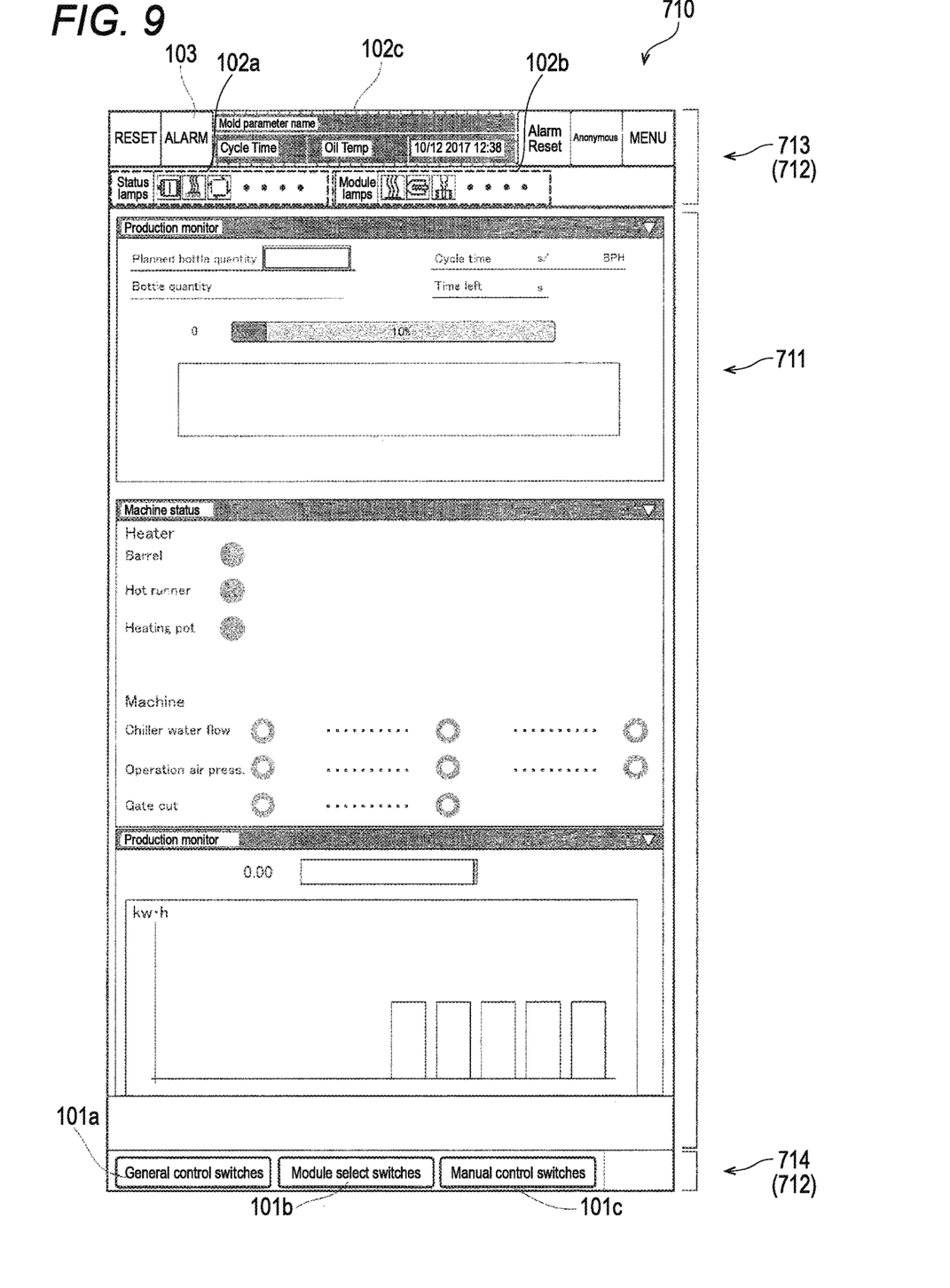
FIG. 9 depicts an example of the display screen provided to the interface device in accordance with the present embodiment.

When a production monitor overview ("Production monitor") is selected on the initial screen, for example, the display of the main display section 711 is displayed. However, as shown in FIG. 9, the icons 104 of the control condition groups are not displayed, and the detailed information (setting managing screens) of a production monitor information group ("Production monitor"), a power consumption information group ("Power consumption"), and the like is displayed on the main display section 711. In the production monitor information group ("Production monitor"), the operator can set a white frame part of a planned production quantity ("Planed bottle quantity") and can check diverse actual measurement values thereof (current production quantity ("Bottle quantity"), production rate ("%"), bottler production quantity per hour ("BPH")). In the power consumption information group ("Power consumption"), power consumption per molding cycle is displayed. Thereby, the operator can check/examine whether there is no delay in the production plan and whether the power consumption is appropriate.

Also, when the menu icon 100 is not selected (step S1: No) on the initial screen and any one of the general operating icon group ("General control switches") 101*a*, the module selecting icon group ("Module select switches") 101*b* and the manual operating icon group ("Manual control switches") 101*c*, which are the display switching icons 101 displayed on the footer section 714, is selected (step S5: Yes), operating icons 105 for operating the diverse equipment that is the control targets are displayed, in correspondence to each of the display switching icons 101 (step S6), as shown in FIG. 10.

Figure 10:
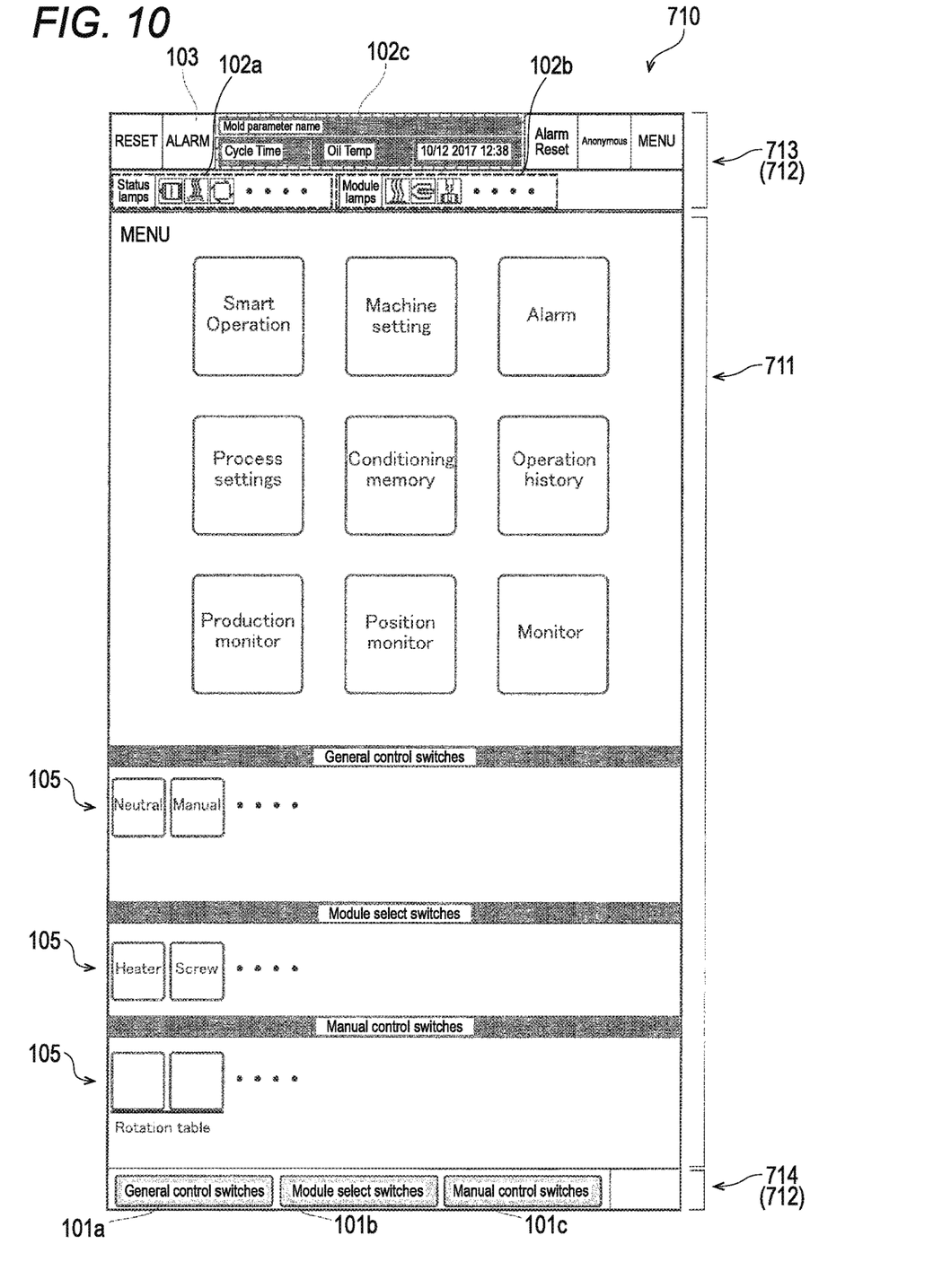
FIG. 10 depicts an example of the display screen provided to the interface device in accordance with the present embodiment.

The example of FIG. 10 is an example where all the icon groups 101*a*, 101*b* and 101*c* are selected. However, the operator can any of the icon groups 101*a*, 101*b* and 101*c*, as required. Therefore, when the operator selects only a necessary object of the three icon groups 101*a*, 101*b* and 101*c*, the operator can operate the blow molding device 1 in a state where the unnecessary operating icons 105 are not displayed and only the necessary operating icons 105 is displayed. Therefore, a space of the main display section 711 in which the control conditions, the molding conditions, the equipment and the molding information are displayed can be used in a widened state.

In the meantime, the menu icons 100 include all mechanical operation buttons (operation switches) provided to the blow molding device of the related art, except an emergency stop button, an advance/retreat switch of the injection device, and the like.

As described above, in the present embodiment, the header section 713 and the footer section 714, which are the sub-display section 712, are provided above and below the main display section 711 on which the setting screen and detailed information of the diverse equipment are displayed. The header section 713 is provided with the status display function that makes it possible to perceive the operational states of the blow molding device 1, and the footer section 714 is provided with the function of displaying the display switching icons for displaying the icons (operating icons, mode selecting icons, and the like) for operating the blow molding device 1.

Since the header section 713 and the footer section 714 are still displayed even though the display of the main display section 711 is switched, the operator can perceive the operational states of the blow molding device 1 all the time, and can arbitrarily operate the blow molding device 1 or select (change) the mode thereof. Also, since the blow molding device 1 can be operated by touching the icons on the screen, the number of the operation switches (mechanical switches) can be reduced, as compared to the related art. Also, since the switches that are different for each model can be changed on the setting screen, the operation panel can be shared.

Also, each of the control conditions can be set/corrected in the state where the control conditions (control items) having correlativity are displayed in one screen. Also, since the icons of control conditions to be frequently operated are displayed, it is possible to set/correct the control conditions of the plurality of stations quickly and easily.

Also, in the blow molding device of the related art, it is necessary to switch the screen many times when setting a station having many control conditions. In the present invention, all the control items belonging to a certain control group (for example, the injection molding unit or the temperature conditioning unit) are displayed in one screen and the display thereof can be freely switched by a touch operation, so that operability is improved.

Also, wireless connection with a mobile terminal can be made possible, so that a setting operation, a data display operation and the like can be performed via the mobile terminal.

Although one embodiment of the present invention has been described, the present invention is not limited to the above embodiment and can be changed as appropriate without departing from the spirit thereof.

In the above embodiment, as the blow molding device of the present invention, the so-called injection blow molding device including the injection molding unit, the temperature conditioning unit, the blow molding unit, and the mold take out unit has been exemplified. However, the blow molding device is not necessarily required to have the injection molding unit. That is, the blow molding device may be configured as a cold parison type or two-stage type, as a whole.

Also, in the above embodiment, the configuration where the blow molding device includes the temperature conditioning unit (temperature conditioning station) for adjusting the temperature of the preform molded in the injection molding unit has been exemplified. However, the blow molding device may include a heating unit (heating station) configured to heat the preform, instead of the temperature conditioning unit.

REFERENCE SIGNS LIST

1: blow molding device
10: injection molding unit
11: injection device
20: temperature conditioning unit
30: blow molding unit
40: take out unit
50: conveyance mechanism
70: controller (control unit)
71: equipment control means
100: menu icon
101: display switching icon
102: status information
103: alarm icon
104: icon of control condition group
105: operating icon
700: interface device
710: display
711: main display section
712: sub-display section
713: header section.
714: footer section
720: display control means
730: mechanical button
740: mechanical switch

The invention claimed is:

1. An interface device configured to be provided to a blow molding device that blow molds a preform into a hollow body, the preform being obtained by injection molding, the interface device comprising:
a display device configured to display, on a setting screen, information for setting control conditions for a plurality of control targets; and
a processor and a memory that stores an instruction, wherein upon execution of the instruction, the processor operates as a display control device configured to control a display state of the setting screen, the display control device being configured to:
cause a main display section to display the information for setting the control conditions as required; and
cause a sub-display section, that is constantly displayed, to constantly display: status information, via a plurality of icons, for perceiving operational states of the control targets; and a display switching icon for causing the main display section to display operating icons of the control targets,
wherein the display control device is configured to cause the main display section to display control condition groups for the plurality of control targets with one screen as required, the control condition groups having correlativity, and
wherein the plurality of control targets are equipment and molding stations.

2. The interface device according to claim 1,
wherein the sub-display section includes:
a header section provided above the main display section; and
a footer section provided below the main display section, and
wherein the display control device is configured to cause the header section to display the status information, and is configured to cause the footer section to display the display switching icon.

3. The interface device according to claim 1,
wherein the display control device is configured to cause the main display section to display control condition groups for the plurality of control targets with one screen as required, the control condition groups being included in a preset control group.

4. The interface device according to claim 1,
wherein the display switching icon remains displayed regardless of an operator's interaction with the display device.

5. The interface device according to claim 1,
wherein the status information includes at least one of an operation status display group indicating an operation state of the plurality of control targets; a selected module display group indicating whether drive devices included in the blow molding device are in a usable state; and a cycle time display group indicating a molding cycle time.

6. The interface device according to claim 1,
wherein the status information includes an operation status display group indicating an operation state of the plurality of control targets, a selected module display group indicating whether drive devices included in the blow molding device are in a usable state, and a cycle time display group indicating a molding cycle time.

7. A blow molding device configured to blow mold a preform into a hollow body, the preform being obtained by injection molding, the blow molding device comprising:
a display device configured to display, on a setting screen, information for setting control conditions for a plurality of control targets; and
a processor and a memory that stores an instruction, wherein upon execution of the instruction, the processor operates as a display control device configured to control a display state of the setting screen, the display control device being configured to:
cause a main display section to display the information for setting the control conditions as required; and
cause a sub-display section, that is constantly displayed, to constantly display: status information, via a plurality of icons, for perceiving operational states of the control targets; and a display switching icon for causing the main display section to display operating icons of the control targets, wherein the display control device is configured to cause the main display section to display control condition groups for the plurality of control targets with one screen as required, the control condition groups having correlativity, and wherein the plurality of control targets are equipment and molding stations.

8. The blow molding device according to claim 7, wherein the display switching icon remains displayed regardless of an operator's interaction with the display device.

9. The blow molding device according to claim 7, wherein the status information includes at least one of an operation status display group indicating an operation state of the plurality of control targets; a selected module display group indicating whether drive devices included in the blow molding device are in a usable state; and a cycle time display group indicating a molding cycle time.

10. The blow molding device according to claim 7, wherein the status information includes an operation status display group indicating an operation state of the plurality of control targets, a selected module display group indicating whether drive devices included in the blow molding device are in a usable state, and a cycle time display group indicating a molding cycle time.

* * * * *